(Model.)
W. GOSSHORN.
GATE.
No. 285,611. Patented Sept. 25, 1883.
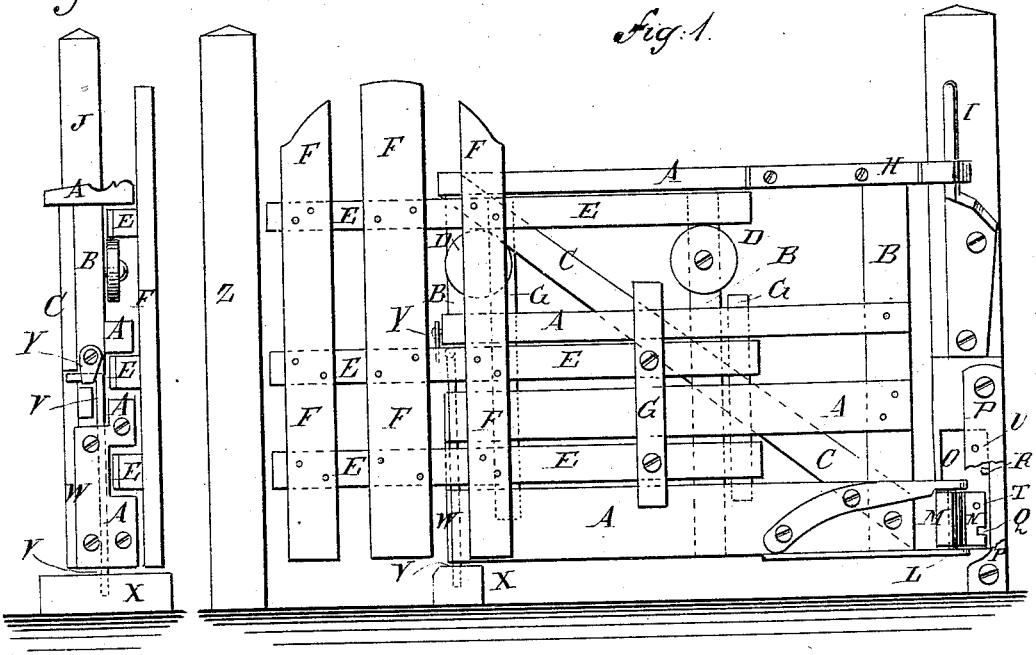
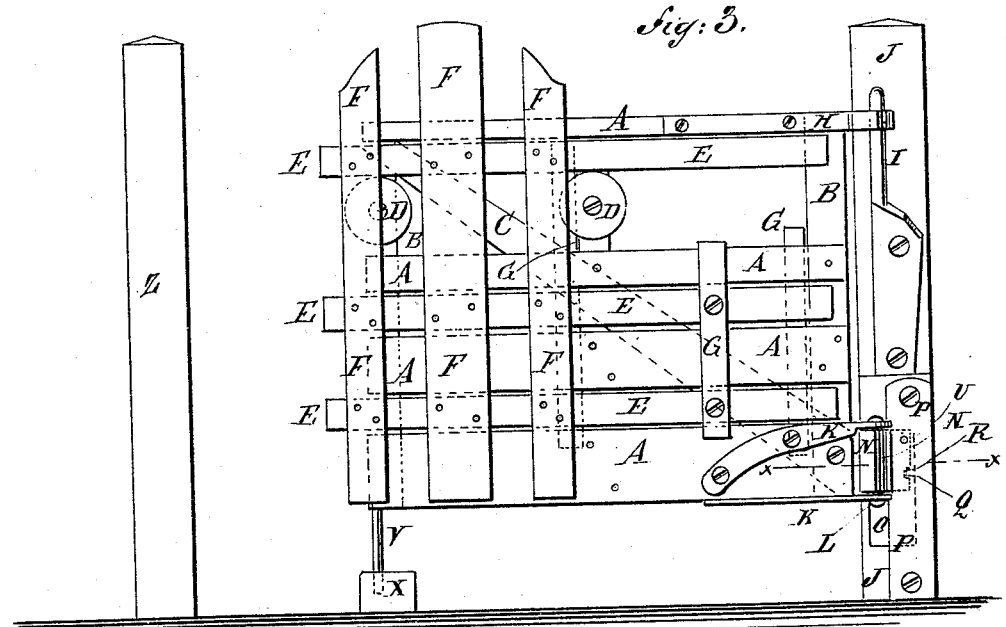
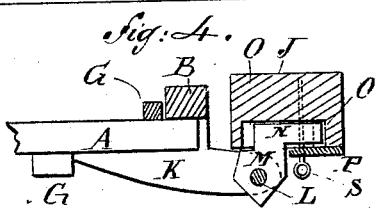
WITNESSES:
Chas. Nida
C. Sedgwick
INVENTOR:
W. Gosshorn
BY Munn & Co.
ATTORNEYS.

UNITED STATES PATENT OFFICE.

WILLIAM GOSSHORN, OF WATERLOO, PENNSYLVANIA.

GATE.

SPECIFICATION forming part of Letters Patent No. 285,611, dated September 25, 1883.

Application filed April 16, 1883. (Model.)

*To all whom it may concern:*

Be it known that I, WILLIAM GOSSHORN, of Waterloo, in the county of Juniata and State of Pennsylvania, have invented a new and useful Improvement in Gates, of which the following is a full, clear, and exact description.

Reference is to be had to the accompanying drawings, forming a part of this specification, in which similar letters of reference indicate corresponding parts in all the figures.

Figure 1 is a front elevation of my improved gate. Fig. 2 is an end elevation of the gate, the front post being omitted. Fig. 3 is the same view as Fig. 1, but showing the small gate pushed back. Fig. 4 is a sectional plan view of a part of the same, taken through the line $x\ x$, Fig. 3.

The object of this invention is to promote convenience in using gates.

To the lower rear corner of the large hinged gate are attached two straps connected at their outer ends by a pivot or bolt which works in a hinge-block having upon it an L-shaped flange to be inserted in a groove in the gate-post, and provided with a recessed edge to engage with a tooth or teeth attached to the gate-post, whereby the gate will be supported securely and can be readily raised and lowered. The forward end of the hinged gate is held in place by a vertically-sliding bolt connected with its front upright bar, as will be hereinafter fully described.

The main or large gate is formed of horizontal bars A, connected by upright bars B and strengthened by an inclined brace-bar, C. To the upper parts of the front and central upright bars B are pivoted two pulleys, D, which are placed a little below the top bar A of the gate.

The small gate is formed of horizontal bars E, connected by upright bars F, attached to the outer part of their forward sides. The horizontal bars E are so arranged as to fit into the spaces between the horizontal bars A of the large gate, the upper horizontal bar E resting upon the pulleys D and supporting the small gate, so that it can be run forward and back easily. The small gate E F G is kept in place upon the large gate A B C by upright bars G, attached to the horizontal bars E, and resting against the front and rear sides of the horizontal bars A of the large gate. The bars G, by coming in contact with the upright bars B of the large gate, serve as stops to limit the movement of the small gate.

To the upper rear corner of the gate A B C is attached the eye-strap H of the upper hinge, the eye of which works upon the long pivot I, attached to the upper part of the rear post, J, as shown in Figs. 1 and 3, so that the gate can be raised without throwing the hinge H I out of gear. To the lower rear corner of the gate A B C are attached two straps, K, the projecting ends of which are connected by a pin or bolt, L, which serves as the pivot of the lower hinge, and which turns in the hinge-block M. Upon the inner side of the hinge-block M is formed an L-shaped flange, N, which enters a groove, O, in the forward side of the lower part of the rear post, J, so as to hinge the lower corner of the gate to the said post. The block M is kept in place in the groove O by a plate, P, attached to the forward side of the post J, and resting against the projecting part of the flange N, as shown in Fig. 4.

In the edge of the flange N is formed a recess, Q, to engage with a pin or tooth, R, secured to the post J at the outer or rear side of the groove O. In the drawings only one tooth R is shown, so that the hinge can be adjusted in only two positions—one with the flange N below the tooth R, as shown in Fig. 1, and the other with the block M raised, so that the recess Q will engage with the tooth R, as shown in Fig. 3. This arrangement allows the gate to be adjusted at two different heights from the ground.

If desired, the groove O can be extended upward, and several teeth R can be attached to the post J; or a series of teeth like a rack-bar can be used, and a series of recesses can be formed in the edge of the flange, so that the gate can be adjusted at any desired height from the ground.

The hinged block M can be fastened in place, when raised above its lowest position, by a pin, S, inserted through a hole, T, in the flange N, and through a hole, U, in the plate P, several holes being formed in the plate P to receive the pin S when a series of teeth R are used. With this construction the gate can be adjusted close to the ground, or can be raised to swing over snow or other obstructions, or to allow small animals to pass beneath it.

The forward end of the large gate A B C is fastened in place by a bolt, V, sliding in keepers W, attached to the front upright bar B, and entering a socket in a block or short post, X, set in the ground. The upper end of the bolt V is bent to one side at right angles, so that it can be turned into a cross-groove in the upright bar of the gate, where it can be secured in place by a button, Y, as shown in Fig. 2.

The small gate E F G, when pushed forward or closed, can be secured to the front post, Z, by any suitable catch.

I am aware that it is not new to use in double slide-gates, where the extension-gate slides in the main gate, one double post and another formed of two uprights set in a grooved slot thereof; or to provide the main gate with rollers running between cleats nailed to an underground sill; or to slide the extension-gate on rollers journaled in the upright bars of the main gate; or to lock the horizontal bars of the extension-gate in mortises of the end post; or to raise the gate by the horizontal bars of the extension-gate and a hand-lever pivoted to a double post; but What I do claim as new and of my invention is—

The combination, with a gate, A B C, a post having groove O, and a plate, P, of the hinge-straps K, pivoted at L, the hinge-block M, having L-shaped recessed flange N, and the tooth or teeth R, whereby the gate may be raised, lowered, and supported at different heights, as described.

WILLIAM GOSSHORN.

Witnesses:
S. B. CAVERY,
J. H. CONN.